Aug. 19, 1958 M. R. GARE 2,848,111
WATER PURIFYING SYSTEM FOR AQUARIUMS
Filed Dec. 31, 1954

INVENTOR.
MORRIS R. GARE
BY
ATTORNEY

United States Patent Office 2,848,111
Patented Aug. 19, 1958

2,848,111

WATER PURIFYING SYSTEM FOR AQUARIUMS

Morris Ralph Gare, Hillside, N. J., assignor to Eureka Products Company, Newark, N. J., a corporation Application December 31, 1954, Serial No. 479,037

2 Claims. (Cl. 210—169)

This invention relates to small home type aquariums and more particularly to a water purifying system for the aquarium. With home type aquariums one of the objectionable features is the foul odor produced by an aquarium after fish have been in the aquarium for a reasonable time. A further objection to the average aquarium is the effect of food droppings and waste material settling within the tank or aquarium and decomposing, causing the sand to turn black and the foul gases having a deleterious effect upon the fish. There have been various attempts to overcome these objectionable features. In one instance, an air stem is inserted into the water causing fresh air to bubble through the water attempting to purify the water. This may help to keep the fish alive but does not remove the foul odor as the decomposing material still remains within the tank. A still further attempt to correct these objectionable features is in the form of a water purifying hollow plate that is inserted in the aquarium and the sand and gravel placed over the plate. The plate is provided with an air stem to its hollow center and the upper face of the plate is provided with a plurality of apertures. In this device, by withdrawing water through the air stem and passing this water through a filter before returning to the tank, the water and comminuted material passes through the filter, thus returning clean fresh water to the tank. Although this assists in purifying the water within the aquarium there are certain objectionable features. With this device the aquarium must be completely cleaned out and the plate must be inserted first before the gravel and sand may be inserted and the water poured into the aquarium. Thus, in using this device, an aquarium must be completely emptied in order to install this device. A further objection to this device is that the plate is located at the bottom of the aquarium and the suction of the water through the apertures must be pulled through the complete body of sand and gravel above the plate no matter how thick it may be.

The purifying system that is assembled according to this invention may be inserted into an aquarium without disturbing fish or the plants and water that are already within the aquarium. This invention includes a plurality of perforated tubular elements that are connected to each other to form a pipe system of a predetermined configuration. This pipe system is, in turn, connected to an air stem. This device, when inserted in a tank, is simply pressed with a slight shifting movement until the device is embedded within the sand and gravel. In use the particles of waste and food droppings will be drawn to the bottom by the action of the system, that is, since a suction is produced on the air stem the flow of water will be downward into the tubular system and up through the air stem to be aerated and returned to the tank for another cycle of operation. This movement of the water holds the particles of waste and food droppings to the bottom, creating a water pressure on the particles. The particles may decompose while held on the sand and gravel bed. As they decompose, the harmful gas is dispelled during the aeration of the water. The only thing that remains on the bed of sand and gravel will be the remaining particles that are decomposing and that act as a fertilizer in the gravel bed assisting in the growth of any plants within the gravel bed. As long as this system is in operation the sand and gravel cannot blacken as is normally the case because the gas that is dispelled normally produces this blackening of the gravel bed. Although there are some small particles of comminuted material that may pass through the purifying syystem, it is not necessary to withdraw these particles or to disperse them as the only harmful ingredient is the gas produced during the decomposition of the food and material found in an aquarium.

It is an object of this invention to provide a water purifying system for an aquarium in which a plurality of perforated tubular elements are interconnected and embedded within the sand and gravel and in which the tubular elements are connected to an air stem to remove the foul gases that accumulate in the water due to decomposition of food and waste material.

A further object of this invention is to provide a plurality of perforated tubular elements, some of the elements formed as straight pipe shaped elements, others formed as elbows, and still others formed as T's, in which all elements are of a similar size so that they may be readily connected together with an ordinary friction connection to form a complete purifying pipe system for an aquarium.

A still further object of this invention is to provide a plurality of interchangeable perforated tubular elements that may be connected together in a predetermined pattern to form a purifying system that will fit any desired shape or size aquarium.

A still further object of this invention is to provide a purifying system for an aquarium that is constructed of a plurality of transparent perforated tubular elements that are interconnected to form a predetermined pattern that properly fits each aquarium with which it is to be used and in which the purifying system is inconspicuous due to its transparency and due to the fact that the tubular elements may be embedded within a gravel bed.

A further object of this invention is to provide a filter system for an aquarium in which a plurality of perforated tubular elements may be interconnected to form a desired pattern that properly fits the aquarium and in which the purifying system may include a filter to assist in purifying the water before it is aerated and returned to the tank.

A further object of this invention may be apparent by reference to the accompanying detailed description and the drawings, in which—

Figure 1:
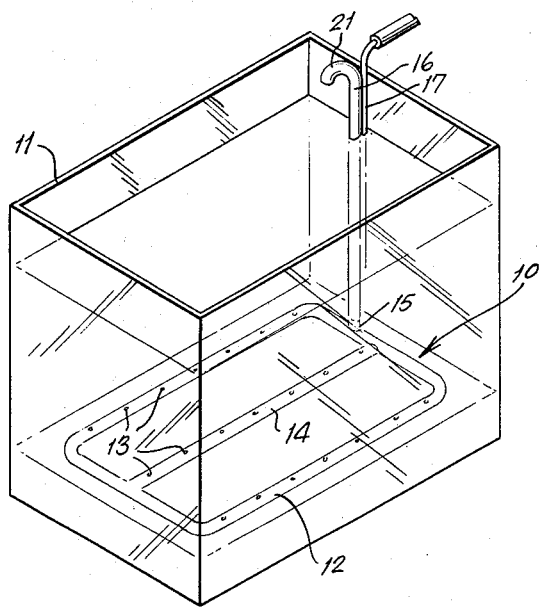
Fig. 1 is a perspective view of an aquarium embodying the filter system.

Referring to the drawings and especially Fig. 1, this invention is primarily concerned with a purifying system 10 mounted within an aquarium 11. The system 10 may take various configurations but in Fig. 1 it is shown as a large rectangular shaped tube 12 with a single tube 14 bisecting the rectangle into two smaller rectangles. This tubular structure is provided with a plurality of apertures 13. At any point on the tubular frame 12 there is provided a stem 15 to permit attaching the element 12 to an air stem or water outlet tube, as illustarted in Fig. 2. The air stem may be a tube 16 provided with an air hose 17. The air hose 17 is connected through an aperture 18 in tube 16 and the end of hose 17 is formed as a jet aperture 19 pointing upward in tube 16. Tube is provided with a straight end 20 at one end thereof and a U-shaped end 21 at the opposite end thereof. The end 20 is utilized to be inserted within the stem 15. Thus, by attaching the air hose 17 to a pump (not shown) the air pressure through tube 17 will produce a suction on the end 20 of the tube 16 and thus lift water from within the perforated tubular elements 12 and 14, the water passing upward through tube 16 and out of the U-shaped end to be aerated before splashing back into the aquarium. It is apparent that a filter system, as described, may be readily inserted within an aquarium without disturbing the fish or the plant life, by pressing the system firmly into the gravel bed until it is slightly below the surface and inconspicuous. With the air hose connected to a pump, the system is ready to operate and will continually circulate water from the bottom of the aquarium, returning it through the air to be aerated and splashing back into the tank. During this circulation all of the harmful gas within the water, due to decomposition of food and waste material, will be expelled.

Figure 2:
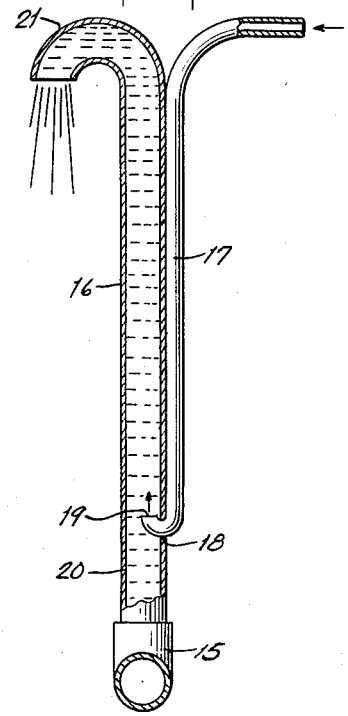
Fig. 2 is a cross-sectional view of the air stem connected to a portion of the filter system.
Figure 3:
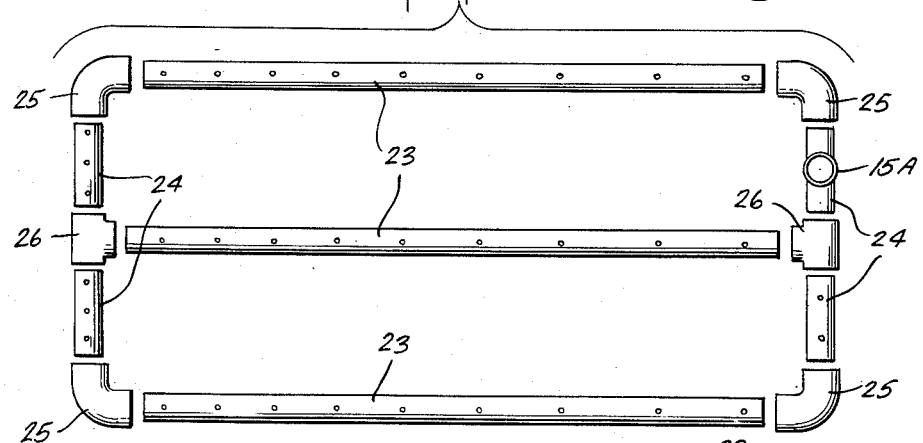
Fig. 3 is an exploded view in plan of the tubular components of the system.

Referring to Fig. 3, it is apparent that the system, as described in Figs. 1 and 2, may be readily constructed of a plurality of tubular elements to form a pattern similar to that shown in Fig. 1, or to form a variety of patterns according to the number of elements and lengths of elements utilized. In Fig. 3 there are illustrated three long perforated tubular elements 23 and a plurality of short straight perforated tubular elements 24. At the four corners of this pattern there are illustrated tubular elbows 25 and at each end of the central element 23 there are illustrated tubular T's 26. One of the elements 24 is provided with a stem 15A that projects at right angles to the element 24. By constructing the tubular components of a similar size the elbows may be fitted to slip over the exterior surface of the tubular elements 23 and 24. The fit is purely a frictional fit but must be tight enough to retain the frame in the form desired once it is assembled. The T's 26 are similarly formed so that they may be fitted over the exterior surface of the tubular elements 23 and 24 and similarly provided with a frictional fit. When assembling a frame to form a purifying system, the element 24 that is provided with a stem 15A should be turned so that the stem 15A faces away from the bottom of the tank so that an air stem, such as 16 of Fig. 2, may be fitted to the stem 15A. It is apparent that with the construction as illustrated in Fig. 3, elements 23 may be provided much longer or two elements 23 may be joined by a collar 30 (Fig. 4) for a long tank. It is also apparent that the elements such as 23 may be easily cut to fit a shorter tank and it is further apparent that if a tank is of a different formation, such as a square tank, the framework may be formed with two or three central tubular elements 23 bisecting the square framework into three or four sections. Thus with a plurality of components, as described in Fig. 3, a framework or purifying system may be readily constructed for any size or shape of tank and, having been constructed, is easily inserted within the tank without disturbing the fish, plant life or the water. Although the examples illustrated in Figs. 1 and 3 show connection for a single air stem, it is readily apparent that in a large tank or aquarium a plurality of air stems may be utilized when necessary.

A further embodiment of this invention is to space the apertures provided in the various tubular elements. In the embodiment already described, these apertures are simply equally spaced whereas in this embodiment the apertures are provided in the tubular elements so that there is a greater spacing between apertures that are located adjacent to the stem 15A and air stem 16, whereas the apertures that are located at an extreme position or the furthest distance from the stem 15A are closely spaced. The reason for the variation in the spacing of the apertures becomes apparent as the greater suction is produced adjacent to the air stem 15A while the degree of suction drops considerably as the distance from stem 15A increases and will, of course, reach a point where it becomes necessary to install an additional stem 15A to produce a proper action over the entire area of the purifying system. Referring to Figs. 1 and 3, the design of the system, as shown, is to provide a maximum distance between any two apertures. This maximum distance must not exceed a predetermined distance so that the suction through the aperture will effect the gravel bed within this area and thus no portion of the gravel bed will be left untouched to allow the blackening effect of the foul gas caused by decomposition of matter. Although the invention includes the use of any tubular elements, it has been found that plastic tubular elements are best fitted for this construction and, further, transparent plastic elements are the most inconspicuous in use. Of course transparent glass elements may be similarly used, but the ease of manufacture and fabrication of the plastic elements permits a cheaper assembly, an easier assembly, and permits the user to tailor the elements to any size with the utmost of ease.

Figure 4:
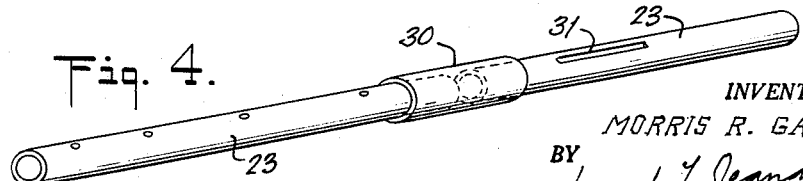
Fig. 4 is a perspective view of one of the perforated tubular elements.

Although there is illustrated a particular formation of a tubular perforated system for purifying the water in an aquarium, the particular design or configuration of the system may be changed without departing from the spirit of this invention and, although a plurality of tubular elements are illustrated, the elements may take any other form such as square or otherwise without departing from the spirit of this invention, and, although applicant describes plastic tubing as best fitted for this device, it is to be understood that glass, metal, or ceramic material may be readily employed to produce a similar device. Although applicant has indicated that a transparent tubing is the least conspicuous, in some instances the tubing may be of a bright color for a decorative effect. Further, although applicant has described the tubular elements as being perforated and has shown the perforations as small apertures, the perforations may also take the form of slots or slits 31, as illustrated in Fig. 4. Further, although applicant has shown an air stem as the means of withdrawing water and aerating same, this invention shall include any outlet pipe in which the water is passed through an aeration process or a filtering process and then returned to the aquarium. Various other changes may be made to this device without departing from the spirit of this invention and this invention shall be limited only by the appended claims.

What is claimed is:

1. In a water purifying system for an aquarium, which includes a plurality of perforated tubular elements, said tubular elements interchangeable and connected together to fit a predetermined area and positioned slightly below the surface of the sand and gravel bed normally used in an aquarium, an air stem connected to the interconnected tubular elements, said perforations of said tubular elements provided in an unequal spacing, said spacing of said perforations being further apart for all tubular elements adjacent to the air stem and being closer together for all tubular elements positioned away from the air stem.

2. In a water purifying system for an aquarium, a plurality of perforated tubular elements, said tubular elements including straight lengths of pipe, elbow shaped pipe, T-shaped pipe, said tubular elements formed of similar size and formed so that they may be interconnected, said interconnected tubular elements connected to an air stem, said placing of said perforations being further apart for all tubular elements adjacent to the air stem and being closer together for all tubular elements positioned away from the air stem.

References Cited in the file of this patent

UNITED STATES PATENTS

| | | |
|---|---|---|
| 279,901 | Martine | June 19, 1883 |
| 1,223,460 | Widner | Apr. 24, 1917 |
| 1,574,783 | Beth | Mar. 2, 1926 |
| 2,242,139 | Munroe | May 13, 1941 |
| 2,491,853 | Feldman | Dec. 20, 1949 |
| 2,595,965 | Ludwick | May 6, 1952 |
| 2,636,473 | Schwartz et al. | Apr. 28, 1953 |
| 2,676,921 | Vansteenkiste | Apr. 27, 1954 |
| 2,730,496 | Zavod | Jan. 10, 1956 |

OTHER REFERENCES

Electrometallurgy, Nov. 18, 1932, page 498.